United States Patent
Zehnacker et al.

(10) Patent No.: US 10,500,540 B2
(45) Date of Patent: Dec. 10, 2019

(54) METHOD FOR DEHUMIDIFYING HUMID GAS MIXTURES USING IONIC LIQUIDS

(71) Applicant: Evonik Degussa GmbH, Essen (DE)

(72) Inventors: Olivier Zehnacker, Dortmund (DE); Xinming Wang, Kanagawa-ken (JP); Benjamin Willy, Düsseldorf (DE); Rolf Schneider, Gründau-Rothenbergen (DE); Marc-Christoph Schneider, Gevelsberg (DE)

(73) Assignee: Evonik Degussa GmbH, Essen (DE)

( * ) Notice: Subject to any disclaimer, the term of this patent is extended or adjusted under 35 U.S.C. 154(b) by 155 days.

(21) Appl. No.: 15/742,436

(22) PCT Filed: Jun. 28, 2016

(86) PCT No.: PCT/EP2016/064942
§ 371 (c)(1),
(2) Date: Jan. 5, 2018

(87) PCT Pub. No.: WO2017/005538
PCT Pub. Date: Jan. 12, 2017

(65) Prior Publication Data
US 2018/0169572 A1    Jun. 21, 2018

(30) Foreign Application Priority Data
Jul. 8, 2015 (DE) .................. 10 2015 212 749

(51) Int. Cl.
*B01D 53/26* (2006.01)
*F24F 3/14* (2006.01)
(Continued)

(52) U.S. Cl.
CPC ......... *B01D 53/28* (2013.01); *B01D 53/1493* (2013.01); *B01D 53/263* (2013.01);
(Continued)

(58) Field of Classification Search
CPC ...... B01D 53/263; B01D 53/28; B01D 53/14; B01D 53/1425; B01D 53/1493;
(Continued)

(56) References Cited

U.S. PATENT DOCUMENTS 1,882,258 A    10/1932    Randel
2,516,625 A    7/1950    Haury
(Continued)

FOREIGN PATENT DOCUMENTS

CA    2 817 704    5/2012
CN    1076380 A    9/1993
(Continued)

OTHER PUBLICATIONS

English language translation of the German Search Report for corresponding German application DE 10 2015 212 749.4, filed Jul. 8, 2015.
(Continued)

*Primary Examiner* — Frank M Lawrence, Jr.
(74) *Attorney, Agent, or Firm* — Law Office of: Michael A. Sanzo, LLC

(57) ABSTRACT

The invention relates to a process for dehumidifying a moist gas mixture. The invention further relates to an apparatus for dehumidifying a moist gas mixture and to the use of said apparatus in the process according to the invention.

20 Claims, 2 Drawing Sheets

Figure 1:
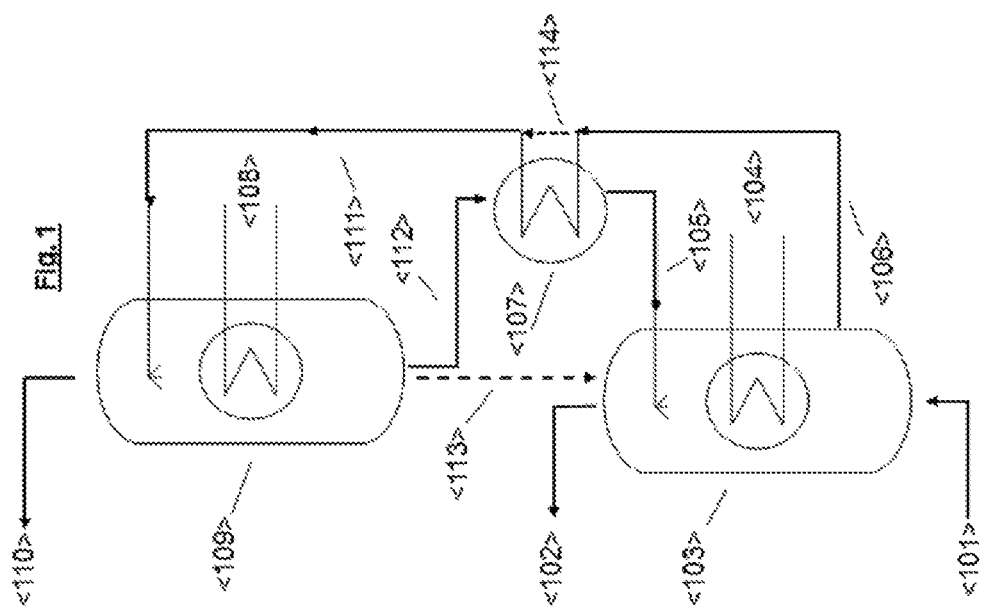

(51) Int. Cl.
  *B01D 53/28* (2006.01)
  *B01D 53/14* (2006.01)
  *C09K 5/04* (2006.01)
  *F25B 15/06* (2006.01)
  *F25B 15/02* (2006.01)
  *F25B 30/04* (2006.01)

(52) U.S. Cl.
  CPC ............ *C09K 5/047* (2013.01); *F24F 3/1417* (2013.01); *F25B 15/02* (2013.01); *F25B 15/06* (2013.01); *F25B 30/04* (2013.01); *B01D 2252/30* (2013.01); *B01D 2257/80* (2013.01); *B01D 2259/4508* (2013.01)

(58) Field of Classification Search
  CPC ............ B01D 2252/30; B01D 2257/80; B01D 2259/4508; C09K 5/047; F24F 3/1417; F25B 15/02; F25B 15/06; F25B 30/04
  USPC ......... 95/149, 156, 178, 179, 180, 187, 231; 96/272, 322; 34/80, 472, 473; 62/114
  See application file for complete search history.

(56) References Cited

U.S. PATENT DOCUMENTS

| | | | |
|---|---|---|---|
| 2,601,673 A | 6/1952 | McMillan et al. |
| 2,802,344 A | 8/1957 | Witherell |
| 3,276,217 A | 10/1966 | Bourne et al. |
| 3,317,654 A | 5/1967 | Yonkers |
| 3,580,759 A | 5/1971 | Albertson et al. |
| 3,609,087 A | 9/1971 | Chi et al. |
| 3,927,151 A | 12/1975 | Ishmail |
| 4,046,719 A | 9/1977 | Stanaback |
| 4,079,263 A | 3/1978 | Inoue |
| 4,094,957 A | 6/1978 | Sartori et al. |
| 4,106,904 A | 8/1978 | Oude Alink et al. |
| 4,112,051 A | 9/1978 | Sartori et al. |
| 4,152,900 A | 5/1979 | Chopra et al. |
| 4,152,901 A | 5/1979 | Munters |
| 4,201,721 A | 5/1980 | Hallgren |
| 4,217,238 A | 8/1980 | Sartori et al. |
| 4,251,494 A | 2/1981 | Say |
| 4,360,363 A | 11/1982 | Ferrin et al. |
| 4,405,579 A | 9/1983 | Sartori et al. |
| 4,405,586 A | 9/1983 | Sartori et al. |
| 4,466,915 A | 8/1984 | Lai |
| 4,489,563 A | 12/1984 | Kalina |
| 4,524,587 A | 6/1985 | Kantor |
| 4,525,294 A | 6/1985 | Sartori et al. |
| 4,605,743 A | 8/1986 | Malz et al. |
| 4,643,000 A | 2/1987 | Rheinfelder |
| 4,701,530 A | 10/1987 | Swearingen et al. |
| 4,714,597 A | 12/1987 | Trevino |
| 4,889,938 A | 12/1989 | Kristen et al. |
| 4,941,324 A | 7/1990 | Peterson et al. |
| 5,016,445 A | 5/1991 | Wehr |
| 5,126,189 A | 6/1992 | Tanny et al. |
| 5,186,009 A | 2/1993 | Rockenfeller |
| 5,186,010 A | 2/1993 | Wehr |
| 5,245,070 A | 9/1993 | Nishikawa |
| 5,255,534 A | 10/1993 | Ryan |
| 5,303,565 A | 4/1994 | Pravada |
| 5,390,509 A | 2/1995 | Rockenfeller et al. |
| 5,583,270 A | 12/1996 | Nishiguchi |
| 5,873,260 A | 2/1999 | Linhardt et al. |
| 6,117,963 A | 9/2000 | Boinowitz et al. |
| 6,128,917 A | 10/2000 | Riesch et al. |
| 6,130,347 A | 10/2000 | Julius et al. |
| 6,155,057 A | 12/2000 | Angell et al. |
| 6,165,433 A | 12/2000 | Chakravarti et al. |
| 6,184,433 B1 | 2/2001 | Harada et al. |
| 6,395,948 B1 | 5/2002 | Hope et al. |
| 6,423,282 B1 | 7/2002 | Araki et al. |
| 6,475,370 B2 | 11/2002 | Lehmann et al. |
| 6,672,099 B1 | 1/2004 | Yoshimi et al. |
| 6,680,047 B2 | 1/2004 | Klaveness et al. |
| 6,727,015 B1 | 4/2004 | Putter et al. |
| 7,419,646 B2 | 9/2008 | Cadours et al. |
| 7,435,318 B2 | 10/2008 | Arlt et al. |
| 7,638,636 B2 | 12/2009 | Zhou et al. |
| 7,666,813 B2 | 2/2010 | Hoefer et al. |
| 7,754,053 B2 | 7/2010 | Maase |
| 7,827,820 B2 | 11/2010 | Weimer et al. |
| 7,998,714 B2 | 8/2011 | Gellett et al. |
| 8,069,687 B2 | 12/2011 | Jork et al. |
| 8,167,983 B2 | 5/2012 | Seiler et al. |
| 8,277,615 B2 | 10/2012 | Ruffert et al. |
| 8,318,117 B2 | 11/2012 | Lichtfers et al. |
| 8,357,344 B2 | 1/2013 | Bouillon et al. |
| 8,362,095 B2 | 1/2013 | Schwab et al. |
| 8,382,962 B2 | 2/2013 | Massonne et al. |
| 8,470,079 B2 | 6/2013 | Agar et al. |
| 8,500,867 B2 | 8/2013 | Seiler et al. |
| 8,500,892 B2 | 8/2013 | Seiler et al. |
| 8,506,839 B2 | 8/2013 | Shiflett et al. |
| 8,523,978 B2 | 9/2013 | Rojey et al. |
| 8,603,226 B2 | 12/2013 | Garcia Andarcia et al. |
| 8,609,572 B2 | 12/2013 | Earl et al. |
| 8,623,123 B2 | 1/2014 | Seiler et al. |
| 8,664,460 B2 | 3/2014 | Earle et al. |
| 8,696,928 B2 | 4/2014 | Seiler et al. |
| 8,703,451 B2 | 4/2014 | Haas et al. |
| 8,715,521 B2 | 5/2014 | Shiflett et al. |
| 8,784,537 B2 | 7/2014 | Seiler et al. |
| 8,809,576 B2 | 8/2014 | Schraven et al. |
| 8,932,478 B2 | 1/2015 | Seiler et al. |
| 9,221,007 B2 | 12/2015 | Rolker et al. |
| 9,409,122 B2 | 8/2016 | Qi et al. |
| 9,630,140 B2 | 4/2017 | Willy et al. |
| 9,840,473 B1 | 12/2017 | Wang et al. |
| 9,878,285 B2 | 1/2018 | Schraven et al. |
| 10,105,644 B2 | 10/2018 | Zehnacker et al. |
| 10,138,209 B2 | 11/2018 | Bahlmann et al. |
| 2002/0169071 A1 | 11/2002 | Sauvage et al. |
| 2002/0198100 A1 | 12/2002 | Mehnert et al. |
| 2003/0085156 A1 | 5/2003 | Schoonover et al. |
| 2004/0016631 A1 | 1/2004 | Madkour |
| 2004/0133058 A1 | 7/2004 | Arlt et al. |
| 2005/0010076 A1 | 1/2005 | Wasserscheid et al. |
| 2005/0070717 A1 | 3/2005 | Wasserscheid et al. |
| 2005/0129598 A1 | 6/2005 | Chinn |
| 2005/0164082 A1 | 7/2005 | Kishi et al. |
| 2005/0202967 A1 | 9/2005 | Hoefer et al. |
| 2005/0245769 A1 | 11/2005 | Kohler et al. |
| 2006/0070919 A1 | 4/2006 | Vallee et al. |
| 2006/0104877 A1 | 5/2006 | Cadours et al. |
| 2006/0128996 A1 | 6/2006 | Vaultier et al. |
| 2006/0150665 A1 | 7/2006 | Weimer et al. |
| 2006/0197053 A1 | 9/2006 | Shiflett et al. |
| 2006/0251961 A1 | 11/2006 | Olbert et al. |
| 2006/0264645 A1 | 11/2006 | Zhou et al. |
| 2007/0004903 A1 | 1/2007 | Hoff et al. |
| 2007/0019708 A1* | 1/2007 | Shiflett ............ F25B 25/02 374/181 |
| 2007/0095645 A1 | 5/2007 | Masse |
| 2007/0142685 A1 | 6/2007 | Elomari et al. |
| 2007/0144186 A1* | 6/2007 | Shiflett ............ C09K 5/047 62/112 |
| 2007/0164462 A1 | 7/2007 | Liu et al. |
| 2007/0264180 A1 | 11/2007 | Carrette et al. |
| 2007/0286783 A1 | 12/2007 | Carrette et al. |
| 2008/0028777 A1 | 2/2008 | Boesmann et al. |
| 2008/0114105 A1 | 5/2008 | Hell et al. |
| 2008/0283383 A1 | 11/2008 | Ruffert et al. |
| 2008/0306319 A1 | 12/2008 | Earle et al. |
| 2009/0029121 A1 | 1/2009 | Hammermann et al. |
| 2009/0029887 A1 | 1/2009 | Schwab et al. |
| 2009/0036334 A1 | 2/2009 | Schwab et al. |
| 2009/0139232 A1 | 6/2009 | Collis |
| 2009/0170734 A1 | 7/2009 | Schwab et al. |
| 2009/0199709 A1 | 8/2009 | Rojey et al. |
| 2009/0211447 A1 | 8/2009 | Lichtfers et al. |
| 2009/0326228 A1 | 12/2009 | Vaultier et al. |

(56) References Cited

U.S. PATENT DOCUMENTS

| | | |
|---|---|---|
| 2010/0011958 A1 | 1/2010 | Cadours et al. |
| 2010/0016205 A1 | 1/2010 | Schwab |
| 2010/0029519 A1 | 2/2010 | Schwab et al. |
| 2010/0071557 A1 | 3/2010 | Seiler et al. |
| 2010/0084597 A1 | 4/2010 | Schwab et al. |
| 2010/0086983 A1 | 4/2010 | Gellett et al. |
| 2010/0095703 A1* | 4/2010 | Jork ............ C09K 5/047 62/476 |
| 2010/0104490 A1 | 4/2010 | Bouillon et al. |
| 2010/0132551 A1 | 6/2010 | Bouillon et al. |
| 2010/0186590 A1 | 7/2010 | Vorberg et al. |
| 2010/0192770 A1 | 8/2010 | Andarcia |
| 2010/0269528 A1 | 10/2010 | Gerhard et al. |
| 2010/0288126 A1 | 11/2010 | Agar et al. |
| 2010/0300870 A1 | 12/2010 | Massonne et al. |
| 2010/0324318 A1 | 12/2010 | Prakash et al. |
| 2010/0326126 A1 | 12/2010 | Seiler et al. |
| 2011/0000236 A1 | 1/2011 | Seiler et al. |
| 2011/0081287 A1 | 4/2011 | Bouillon et al. |
| 2011/0094381 A1 | 4/2011 | Lichtfers et al. |
| 2011/0118504 A1 | 5/2011 | Haas et al. |
| 2011/0135549 A1 | 6/2011 | Lichtfers et al. |
| 2011/0185901 A1 | 8/2011 | Jacquin et al. |
| 2011/0247494 A1 | 10/2011 | Dinnage et al. |
| 2011/0256043 A1 | 10/2011 | Blair et al. |
| 2011/0309295 A1 | 12/2011 | Joh et al. |
| 2012/0011886 A1 | 1/2012 | Shiflett et al. |
| 2012/0017762 A1 | 1/2012 | Seiler et al. |
| 2012/0024756 A1 | 2/2012 | Verma et al. |
| 2012/0080644 A1 | 4/2012 | Seiler et al. |
| 2012/0117991 A1 | 5/2012 | Rached |
| 2012/0186993 A1 | 7/2012 | Huang et al. |
| 2012/0204718 A1* | 8/2012 | Dinnage ........... B01D 53/06 95/91 |
| 2012/0247144 A1 | 10/2012 | Seiler et al. |
| 2012/0308458 A1 | 12/2012 | Seiler et al. |
| 2012/0315366 A1 | 12/2012 | Zehnacher et al. |
| 2013/0011314 A1 | 1/2013 | Porcheron et al. |
| 2013/0023712 A1 | 1/2013 | Porcheron et al. |
| 2013/0026073 A1 | 1/2013 | Martinez Palou et al. |
| 2013/0031930 A1 | 2/2013 | Seiler et al. |
| 2013/0031931 A1 | 2/2013 | Seiler et al. |
| 2013/0118350 A1 | 5/2013 | Rolker et al. |
| 2013/0133327 A1 | 5/2013 | Milam et al. |
| 2013/0219949 A1 | 8/2013 | Seiler et al. |
| 2013/0247758 A1 | 9/2013 | Seiler et al. |
| 2013/0255287 A1 | 10/2013 | Forkosh |
| 2013/0255496 A1 | 10/2013 | Zhang et al. |
| 2013/0263743 A1 | 10/2013 | Seiler et al. |
| 2013/0319022 A1 | 12/2013 | Becze et al. |
| 2013/0327084 A1 | 12/2013 | Shiflett et al. |
| 2014/0005344 A1 | 1/2014 | Rinker et al. |
| 2014/0079613 A1 | 3/2014 | Andarcia et al. |
| 2014/0090558 A1 | 4/2014 | Rolker et al. |
| 2014/0091008 A1 | 4/2014 | Hardarce et al. |
| 2014/0105801 A1 | 4/2014 | Rolker et al. |
| 2014/0120016 A1 | 5/2014 | Rolker et al. |
| 2014/0127103 A1 | 5/2014 | Qi et al. |
| 2014/0356268 A1 | 12/2014 | Schraven et al. |
| 2014/0360369 A1 | 12/2014 | Schraven et al. |
| 2015/0024106 A1 | 1/2015 | Huller et al. |
| 2015/0024247 A1 | 1/2015 | Lockett et al. |
| 2015/0030524 A1* | 1/2015 | Ji ............ C01B 32/50 423/437.1 |
| 2015/0125373 A1 | 5/2015 | Willy et al. |
| 2015/0141315 A1 | 5/2015 | Jin |
| 2015/0175738 A1 | 6/2015 | Willy et al. |
| 2015/0175740 A1 | 6/2015 | Willy et al. |
| 2015/0308720 A1 | 10/2015 | Zehnacker et al. |
| 2015/0321139 A1 | 11/2015 | Schraven et al. |
| 2016/0045857 A1 | 2/2016 | Rolker et al. |
| 2016/0115827 A1 | 4/2016 | Rached |
| 2016/0153318 A1 | 6/2016 | Busse et al. |
| 2016/0175766 A1 | 6/2016 | Zehnacker et al. |
| 2017/0022447 A1 | 1/2017 | Atkins et al. |
| 2017/0107449 A1 | 4/2017 | Hruschka et al. |
| 2017/0354921 A1 | 12/2017 | Zehnacker et al. |
| 2017/0354922 A1 | 12/2017 | Zehnacker et al. |
| 2017/0354923 A1 | 12/2017 | Zehnacker et al. |
| 2017/0354924 A1 | 12/2017 | Irfan et al. |
| 2017/0355680 A1 | 12/2017 | Wang et al. |
| 2017/0355681 A1 | 12/2017 | Bahlmann et al. |
| 2017/0355682 A1 | 12/2017 | Willy et al. |
| 2018/0134987 A1 | 5/2018 | Fedor et al. |
| 2018/0134988 A1 | 5/2018 | Fedor et al. |
| 2018/0148665 A1 | 5/2018 | Goodrich et al. |

FOREIGN PATENT DOCUMENTS

| | | |
|---|---|---|
| CN | 102335545 | 2/2012 |
| CN | 102031202 | 5/2012 |
| CN | 105061496 A | 11/2015 |
| DE | 400 488 | 8/1924 |
| DE | 633 146 | 7/1936 |
| DE | 737031 | 7/1943 |
| DE | 36 23 680 A1 | 1/1988 |
| DE | 266 799 A1 | 4/1989 |
| DE | 195 11 709 | 10/1996 |
| DE | 103 33 546 | 2/2005 |
| DE | 10 2004 053 167 | 5/2006 |
| DE | 10 2010 001 070 | 7/2011 |
| DE | 10 2010 004 779 | 7/2011 |
| DE | 10 2011 055 859 | 6/2013 |
| DE | 10 2013 010 035 | 12/2014 |
| DE | 10 2014 214 670 | 1/2016 |
| DE | 10 2014 214 674 | 1/2016 |
| DE | 10 2014 214 682 | 1/2016 |
| DE | 10 2014 110190 | 1/2016 |
| DE | 10 2015 212 749 | 1/2017 |
| DE | 10 2016 210 481 | 6/2017 |
| DE | 10 2016 204 928 | 9/2017 |
| DE | 10 2016 204 929 | 9/2017 |
| DE | 10 2016 204 930 | 9/2017 |
| DE | 10 2016 204 931 | 9/2017 |
| DE | 10 2016 204 932 | 9/2017 |
| DE | 10 2016 204 937 | 9/2017 |
| EP | 0 033 529 A1 | 1/1981 |
| EP | 0 047 967 | 9/1981 |
| EP | 0 079 767 | 5/1983 |
| EP | 0 187 130 | 7/1986 |
| EP | 0 193 327 | 9/1986 |
| EP | 0 302 020 | 2/1989 |
| EP | 0 558 019 | 2/1993 |
| EP | 0 791 643 | 8/1997 |
| EP | 2 636 715 | 9/2013 |
| EP | 2 940 394 | 11/2015 |
| FR | 670 497 | 11/1929 |
| FR | 2 861 084 | 4/2005 |
| FR | 2 900 841 A1 | 11/2007 |
| GB | 1 306 853 | 2/1973 |
| GB | 1 501 195 | 2/1978 |
| GB | 2 047 681 | 12/1980 |
| GB | 2 528 494 | 1/2016 |
| JP | 33-009879 B | 11/1958 |
| JP | 57-191407 | 11/1982 |
| JP | 61-129019 | 6/1986 |
| JP | 62-73055 | 4/1987 |
| JP | 1-134180 | 5/1989 |
| JP | H01-198679 | 8/1989 |
| JP | 2-298767 | 12/1990 |
| JP | 4-268176 | 9/1992 |
| JP | 6-307730 | 11/1994 |
| JP | 7-167521 | 7/1995 |
| JP | 09 313864 | 12/1997 |
| JP | 2000-202299 | 7/2000 |
| JP | 2001-219164 | 8/2001 |
| JP | 2002-047258 | 2/2002 |
| JP | 2004-44945 | 2/2004 |
| JP | 2006-160969 | 6/2006 |
| JP | 2006-239516 | 9/2006 |
| JP | 2006-282525 | 10/2006 |
| JP | 2010-034301 | 2/2010 |
| JP | 2010-54136 | 3/2010 |
| JP | 2013-051238 | 3/2013 |

(56) References Cited

FOREIGN PATENT DOCUMENTS

| | | |
|---|---|---|
| JP | 2013-139425 | 7/2013 |
| JP | 2013-250186 | 12/2013 |
| RU | 2 101 625 | 1/1998 |
| RU | 2 122 642 | 11/1998 |
| RU | 2 183 003 | 5/2002 |
| WO | WO 93/13367 | 7/1993 |
| WO | WO 00/61698 A1 | 10/2000 |
| WO | WO 2002/016671 | 2/2002 |
| WO | WO 2004/016631 | 2/2004 |
| WO | WO 2004/082809 | 9/2004 |
| WO | WO 2006/012097 | 2/2006 |
| WO | WO 2006/048182 | 5/2006 |
| WO | WO 2007/099041 | 9/2007 |
| WO | WO 2007/101397 | 9/2007 |
| WO | WO 2007/138307 | 12/2007 |
| WO | WO 2009/032959 | 3/2009 |
| WO | WO 2009/074535 | 6/2009 |
| WO | WO 2009/133059 | 11/2009 |
| WO | WO 2010/037109 | 4/2010 |
| WO | WO 2010/136783 | 12/2010 |
| WO | WO 2011/131552 | 10/2011 |
| WO | WO 2012/082093 | 6/2012 |
| WO | WO 2012/110987 | 8/2012 |
| WO | WO 2012/150051 | 11/2012 |
| WO | WO 2013/041300 | 3/2013 |
| WO | WO 2013/050230 | 4/2013 |
| WO | WO 2013/050242 | 4/2013 |
| WO | WO 2013/072147 | 5/2013 |
| WO | WO 2015/000637 | 1/2015 |
| WO | WO 2015/079262 | 6/2015 |
| WO | WO 2016/005769 | 1/2016 |
| WO | WO 2016/189330 | 12/2016 |
| WO | WO 2016/189333 | 12/2016 |
| WO | WO 2017/005538 | 1/2017 |

OTHER PUBLICATIONS

English language translation of Singaporian Written Opinion for corresponding Singapore application 11201709074P, filed Jun. 28, 2016.
Kuhlmann, et al., "Imidazolium dialkylphosphates—a class of versatile, halogen-free and hydrolytically stable ionic liquids," *Green Chem.* 9:233-242 (2007).
Li, et al., "Efficient absorption of ammonia with hydroxyl-functionalized ionic liquids," *RCS Adv.* 5:81362-81370 (2015).
Kanakubo, et al., "$CO_2$ solubility in and physical properties for ionic liquid mixtures of 1-butyl-3-methylimidazolium acetate and 1-butyl-3-methylimidazolium bis(trifluoromethanesulfonyl)amide," *Journal of Molecular Liquids* 217:112-119 (2016); available online Feb. 12, 2016.
Krannich, et al., "Characterization of Six Hygroscopic Ionic Liquids with Regard to Their Suitability for Gas Dehydration: Density, Viscosity, Thermal and Oxidative Stability, Vapor Pressure, Diffusion Coefficient, and Activity Coefficient of Water," *Journal of Chemical Engineering & Data* 61:1162-1176 (Feb. 2016).
Kriebel, et al., "Absorption, 2. Design of Systems and Equipment," Ulmann's Encyclopedia of Industrial Chemistry, vol. 1, pp. 75-90 (2008).
Lall-Ramnarine, et al., "Probing the Physical Properties, Synthesis and Cellulose Dissolution Ability of Dialkyl Phosphate Ionic Liquids," *Phosphorous, Sulfur, and Silicon* 190:891-895 (2015).
Lungwitz, Ralf, "Ionische Flüssigkeiten—Polarität und Wechselwirkungen mit silikatischen Oberflächen," Dissertation Technische Universität Chemnitz (Nov. 2011); with English language translation of relevant parts.
English language translation of Mao, et al., "Development and Application of New Technique for Recovery of Low Partial Pressure Carbon Dioxide," *Journal of Chemical Industry & Engineering* 25(3):12-15 (Jun. 2004).
English language translation of Rolker, et al., "Separation of carbon dioxide from flue gases by means of absorption," *Chemie Ingenieur Tecknik* 78(4):416-424 (Jul. 2006).

OECD Guidelines for the Testing of Chemicals, Test No. 104, items 14-19, (adopted May 1981).
Projekt der Deutschen Bundesstiftung: Gasreinigung mit ionischen Flüssigkeiten Umwelt; Endbericht (Sep. 2009); with English language translation of relavant parts.
English language translation of Xiao, "Study on Technique for Recovery of Carbon Dioxide from Flue Gas," *Modern Chemical Industry* 24(5):47-49 (May 2004).
"Mutual Solubility of Water and Pyridine Derivatives" by Richard M. Stephenson, *J. Chem. Eng. Data* 38, p. 428-431, (Jul. 1993).
"Review of Organic Functional Groups: Introduction to Medicinal Organic Chemistry" by Thomas L. Lemke, Lippincott Williams & Wilkins, p. 40 (2003).
"Review of Organic Functional Groups: Introduction to Medicinal Organic Chemistry" by Thomas L. Lemke, Lippincott Williams & Wilkins, p. 39 (2003).
Brennecke, et al., "Ionic Liquids: Innovative Fluids for Chemical Processing," *AIChE Journal* 47(11):2384-2389 (Nov. 2001).
Chua, et al., "Improved Thermodynamic Property Fields of LiBr—$H_2O$ Solution," *International Journal of Refrigeration* 23:412-429 (Sep. 2000).
De Lucas, et al., "Vapor Pressures, Densities, and Viscosities of the (Water + Lithium Bromide + Lithium Formate) System and (Water + Lithium Bromide + Potassium Formate) System," *Journal of Chemical and Engineering Data*, American Chemical Society, US 48(1):18-22 (Jan. 2003).
De Lucas, et al., "Absorption of Water Vapor into Working Fluids for Absorption Refrigeration Systems," *Industrial & Engineering Chemistry Research*, American Chemical Society, US 46(1):345-350 (2007); (published online Dec. 2006).
Domanska, et al., Solubility of 1-Alkyl-3-ethylimidazolium-Based Ionic Liquids in Water and 1-Octanol, *J. Chem. Eng. Data* 53:1126-1132 (Apr. 2008).
Galán, et al., "Solvent Properties of Functionalized Ionic Liquids for $CO_2$ Absorption," *IChemE* 85(A1):31-39 (Jan. 2007).
Glebov, et al., "Experimental Study of Heat Transfer Additive Influence on the Absorption Chiller Performance," *International Journal of Refrigeration* 25:538-545 (Aug. 2002).
Kim, et al., "Surface tension and viscosity of 1-butyl-3-methylimidazolium iodide and 1-butyl-3-methylimidazolium tetrafluoroborate, and solubility of lithium bromide+1-butyl-3-methylimidazolium bromide in water," *Korean J. Chem. Eng.* 23(1):113-116 (Jan. 2006).
Kim, et al., "Performance Evaluation of Absorption Chiller Using $LiBr+H_2N(CH_2)_2OH+H_2O$, $LiBr+HO(CH_2)_3OH+H_2O$, and $LiBr+(HOCH_2CH_2NH+H_2O$ as Working Fluids," *Applied Thermal Engineering* 19:217-225 (Feb. 1999).
Kim, et al., "Refractive Index and Heat Capacity of 1-Butyl-3-Methylimidazolium Bromide and 1-Butyl-3-Methylimidazolium Tetrafluoroborate, and Vapor Pressure of Binary Systems for 1-Butyl-3-Methylimidazolium Tetrafluoroborate—Trifluoroethanol," *Fluid Phase Equilibria* 218:215-220 (Apr. 2004).
Li, et al., "Correlation and Prediction of the Solubility of $CO_2$ and $H_2S$ in an Aqueous Solution of 2-Piperidineethanol and Sulfolane," *Ind. Eng. Chem. Res.* 37:3098-3104 (May 1998).
Liu, et al., The physical properties of aqueous solution of room-temperature ionic liquids based on imidazolium:Database and Evaluation, *J. Mol. Liquids* 140:68-72 (Jan. 2008).
Mitsubishi Heavy Industries, Ltd., "Flue Gas $CO_2$ Recovery Technology and Its Application to EOR: an Effective Strategy for Addressing the Issues of Global Warming and Peaking Oil Supply," vol. 44, p. 20-23 (2007).
Perez-Blanco, "A Model of an Ammonia-Water Falling Film Absorber," ASHRAE Transactions vol. 94, pp. 467-483, 1988; Presented at the winter meeting in Dallas Texas of the American Society of Heating, Refrigerating and Air-Conditioning Engineers, Inc. (1988).
Rolker, et al., "Abtrennung von Kohlendioxid aus Rauchgasen mittels Absorption," *Chemie Ingenieur Technik* 78:416-424; with English language abstract attached (Jul. 2006).
Wasserscheid, et al., "Ionic Liquids—New "Solutions" for Transition Metal Catalysis," *Angew. Chem. Int. Ed.* 39:3772-3789 (Nov. 2000).

(56) References Cited

OTHER PUBLICATIONS

Wu, et al., "Novel Ionic Liquid Thermal Storage for Solar Thermal Electric Power Systems," *Proceeding of Solar Forum. Solar Energy: The Power to Choose* (Apr. 21-25, 2001).

Yoon, et al., "Cycle Analysis of Air-Cooled Absorption Chiller Using a New Working Solution," *Energy* 24:795-809 (Sep. 1999).

Zhang, et al., "Screening of ionic Liquids to Capture CO2 by COSMO-RS and Experiments," *AIChE Journal* 54(10):2171-2728 (Oct. 2008).

Zhou, The Vapor Surfactant Theory of Absorption and Condensation Enhancement, *Proc. Int. Sorption Heat Pump Conference*, (Sep. 24-27, 2002).

Ziegler, et al., "Heat-Transfer Enhancement by Additives," *International Journal of Refrigeration* 19:301-309 (Jun. 1996).

Ziegler, et al., "Multi-effect absorption chillers," *Rev. Int. Froid* 16(5):301-311 (1993).

Ziegler, et al., "Recent developments and future prospects of sorption heat pump systems," *Int. J. Therm. Sci.* 38:191-208 (Mar. 1999).

U.S. Appl. No. 14/124,472, filed Dec. 6, 2013, US-2014/0090558 A1, Apr. 3, 2014, Rolker.

U.S. Appl. No. 14/925,183, filed Oct. 28, 2015, US-2016/0045857 A1, Feb. 18, 2016, Rolker.

U.S. Appl. No. 14/973,084, filed Dec. 17, 2015, US-2016/0175766 A1, Jun. 23, 2016, Zehnacker.

U.S. Appl. No. 15/486,300, filed Apr. 13, 2017, US-2017/0355681 A1, Dec. 14, 2017, Bahlmann.

U.S. Appl. No. 15/619,561, filed Jun. 12, 2017, US-2017/0354924 A1, Dec. 14, 2017, Irfan.

U.S. Appl. No. 15/619,566, filed Jun. 12, 2017, US-2017/0355682 A1, Dec. 14, 2017, Willy.

U.S. Appl. No. 15/619,573, filed Jun. 12, 2017, US-2017/0354923 A1, Dec. 14, 2017, Zehnacker.

U.S. Appl. No. 15/619,577, filed Jun. 12, 2017, US-2017/0354921 A1, Dec. 14, 2017, Zehnacker.

U.S. Appl. No. 15/619,584, filed Jun. 12, 2017, US-2017/0354922 A1, Dec. 14, 2017, Zehnacker.

Blachly, et al., "Stabilization of Monoethanolmine Solutions in Carbon Dioxide Scrubbers," *J. Chem. Eng. Data* 11(3):401-403 (Jul. 1966).

Call, "Aminoxyle—eine Klasse stabiler," *Pharmazie in unserer Zeit* 3:83-95 (Jan. 1977); with English language translation attached.

Kirchhoff, et al., "Triacetoneamine Derivatives Industrial Applications and Recent Developments," pp. 1-9, Addcon World '99 (Two-Day Conference, Oct. 1999).

Lewin, et al., "Molecular Features Associated with Polyamine Modulation of NMDA Receptors," *J. Med. Chem.* 41:988-995 (published online Feb. 1998).

Luo, et al., "Dehumidification performance of [EMIM]BF$_4$," *Applied Thermal Engineering* 31(14-15):2772-2777 (Oct. 2011).

Luo, et al., "Investigation of feasibility of ionic liquids used in solar liquid desiccant air conditioning system," *Solar Energy* 86(9):2781-2724 (Sep. 2012).

Ionische Flüssigkeiten—Polarität und Wechselwirkungen mit silikatischen Oberflächen, Dissertation Technische Universität Chemnitz (Nov. 2011); with English language translation of pp. 14, 24, 39-41, 48-49 and 111; also sections 2.3.3, 3.1.1 and 5.3.

Projekt der Deutschen Bundesstiftung: Gasreinigung mit ionischen Flüssigkeiten Umwelt; Endbericht (Sep. 2009); with English language translation of pp. 18-23 and 90-92.

Satori, et al., "Sterically Hindered Amines for $CO_2$ Removal from Gases," *Ind. Eng. Chem. Fundam.* 22(2):239-249 (accepted Jan. 1983).

Gerald Scott, Develpoments in polymer stabilization-5, Chapter 3: Antioxidant action of sterically hindered amines and related compounds, Shlyapintokh and Ivanor; pp. 41-70, Applied Science Publishers (1982).

Shao & Stangeland, "Amines Used in $CO_2$ Capture—Health and Environmental Impacts," Bellona Report (Sep. 2009).

Ulmann's Encyclopedia of Industrial Chemistry, 5th Edition, vol. 83, "Antioxidants" pp. 91-104 (1985).

Wellner, et al., "Entwässerung ionischer Flüssigkeiten in einem Fallfilmverdampfer," *Chemie Ingenieur Technik* 83(9):1493-1501(Jul. 2011); with complete English language translation.

Yunus, "Gaslöslichkeit in ionischen Flüssigkeiten," IsoSORP Application Note Nr. 4:1-2 (Feb. 2014); with complete English language translation.

Encylopedia of Chemical Process and Design, Ed. John J. McKetta, vol. 32. Marcel Deckker, Inc. (1990) pp. 123-126.

International Search Report for PCT/EP2016/064942, filed Jun. 28, 2016.

English language translation of the Written Opinion of the International Searching Authority for PCT/EP2016/064942, filed Jun. 28, 2016.

English language translation of the International Preliminary Report on Patentability for PCT/EP2016/064942, filed Jun. 28, 2016.

Chung, et al., "Dehumidification of Moist Air With Simultaneous Removal of Selected Indoor Pollutants by Triethylene Glycol Solutions in a Packed-Bed Absorber," *Separation Science and Technology* 30(7-9):1807-1832 (1995).

U.S. Appl. No. 16/300,466, filed Nov. 9, 2018, Wang.

Abelló, et al., "Supported choline hydroxide (ionic liquid) as heterogeneous catalyst for aldol condensation reactions," *Chem. Comm.* 1096-1097 (2004).

Alcade, et al., "A Simple Halide-to-Anion Exchange Method of Heteroaromatic Salts and Ionic Liquids," *Molecules* 17:4007-4027 (2012).

Cole, et al., "Novel Brønsted Acidic Ionic Liquids and Their Use as Dual Solvent—Catalysts," *J. Am. Chem. Soc.* 124:5962-5963 (2002).

Ishiguro, et al., "Structure, solvation, and acid-base property in ionic liquids," *Pure Appl. Chem.* 82(10):1927-1941 (Aug. 2010).

Manic, et al., "Extraction of Free Fatty Acids from Soybean Oil Using Ionic Liquids or Poly(ethyleneglycol)s," *AIChE* 57(5):1344-1355 (May 2011).

Nockemann, et al., "Task-Specific Ionic Liquid for Solubilizing Metal Oxides," *J. Phys. Chem.* 110(42): 20978-20992 (Oct. 2006).

Smiglak, et al., "New hydrogen carbonate precursors for efficient and byproduct-free synthesis of ionic liquids based on 1,2,3,-tirmethylimidazolium and N,N-dimethylpyrrolidinium cores," *Green Chem.* 12:491-501 (2010).

Zhao, et al., "Review: Use of ionic liquids as 'green' solvents for extractions," *J. Chem. Technol. Biotechnol.* 80: 1089-1096 (published online May 2005).

Notice of Allowance dated Jul. 30, 2019 for copending U.S. Appl. No. 15/619,561.

Notice of Allowance dated Aug. 7, 2019 for copending U.S. Appl. No. 15/619,573.

Notice of Allowance dated Aug. 8, 2019 for copending U.S. Appl. No. 15/619,577.

\* cited by examiner

METHOD FOR DEHUMIDIFYING HUMID GAS MIXTURES USING IONIC LIQUIDS

CROSS REFERENCE TO RELATED APPLICATIONS

The present application is US national stage of international application PCT/EP2016/064942, which had an international filing date of Jun. 28, 2016, and which was published in English under PCT Article 21(2) on Jan. 12, 2017. The application claims priority to German application DE 102015212749.4, filed on Jul. 8, 2015.

The invention relates to a process for dehumidifying a moist gas mixture. The invention further relates to an apparatus for dehumidifying a moist gas mixture and to the use of said apparatus in the process according to the invention.

BACKGROUND OF THE INVENTION

Dehumidification of moist gas mixtures is necessary in a multitude of technical fields.

For instance ventilation and air conditioning of buildings or vehicles generally necessitates not only cooling but also dehumidification of the air since the air to be cooled is often so humid that during cooling to the desired temperature the temperature falls below the dew point temperature. Hence in conventional air conditioning systems dehumidification of the air accounts for a large part of the electricity consumption.

The electricity consumption of air conditioning systems for buildings is reduced by dehumidifying the air by adsorption or absorption of water with a drying medium and subsequently regenerating the water-laden drying medium by heating to a temperature at which the water is desorbed again. Compared to adsorption on a solid absorbent, the advantage of absorption in a liquid absorption medium is that drying of air can be performed with reduced equipment complexity and with less drying medium and that regeneration of the water-laden drying medium using solar heat is easier to carry out.

A further technical field where dehumidifying of moist gas mixtures is employed is the field of absorption chillers (principle described in WO 2014/079675 A1). Here, the damp gas mixture is formed during evaporation of water under low pressure. The water vapour thus formed needs to be removed from the moist gas mixture so that said mixture may then be returned to the water evaporation to pass through a new cycle. Here too, absorption in a liquid absorption medium is favoured over absorption in a solid absorption medium.

Finally, dehumidification of moist gas mixtures is also important in the field of natural gas extraction, as described in DE 10 2010 004 779 A1 for example.

Examples of materials incorporated in air or natural gas dehumidifying plants and in chillers include titanium, copper and noble metals. Components based on aluminium too are installed in air dehumidifying plants. Compared to alternative materials such as titanium, copper or stainless steel, aluminium has the advantage that it has a higher thermal conductivity. It is additionally easier to process, lighter and cheaper. Hence in automobile manufacture in particular air conditioning systems made of aluminium are preferred over other materials.

The aqueous solutions of lithium bromide, lithium chloride or calcium chloride hitherto employed as liquid absorption media in commercial air conditioning systems have the disadvantage that they are corrosive towards the materials of construction typically employed in air conditioning systems and that they thus necessitate the use of expensive specific materials of construction. This problem is encountered particularly for aluminium. These solutions can additionally cause problems due to salt crystallizing out of the absorption medium.

Y. Luo et al., Appl. Thermal Eng. 31 (2011) 2772-2777 proposes using the ionic liquid 1-ethyl-3-methylimidazolium tetrafluoroborate in place of an aqueous solutions of lithium bromide for drying of air. However, this ionic liquid has the disadvantage of only poor absorption capability.

Y. Luo et al., Solar Energy 86 (2012) 2718-2724 proposes using the ionic liquid 1,3-dimethylimidazolium acetate as an alternative to 1-ethyl-3-methylimidazolium tetrafluoroborate for drying of air. However, 1,3-dimethylimidazolium acetate is not stable and decomposes to a not inconsiderable extent during desorption.

This problem is also encountered for the ionic liquid proposed in US 2011/0247494 A1, paragraph [0145]. This document proposes using trimethylammonium acetate or 1-ethyl-3-methylimidazolium acetate as liquid drying agent in place of aqueous lithium chloride solution. Example 3 compares water uptake from moist air for a series of further ionic liquids.

CN 102335545 A describes aqueous solutions of ionic liquids that do not suffer from the abovementioned problems as absorption media for air dehumidification. The absorption media are reported to be noncorossive toward steel. Ionic liquids described are, inter alia, 1,3-dimethylimidazolium dimethylphosphate, 1-ethyl-3-methylimidazolium dimethylphosphate and 1-butyl-3-methylimidazolium dimethylphosphate. However, CN 102335545 A is chiefly concerned with steel-based air dehumidifiers. Yet this material is disadvantageous compared to aluminium for the abovementioned reasons. Additionally the heat transfer achieved with the ionic liquids cited in CN 102335545 A, which is important for efficient air dehumidification, was relatively low.

The present invention accordingly has for its object to provide absorption media that exhibit lower corrosivity than prior art absorption media when used in aluminium-based air conditioning systems, air dehumidifiers, absorption chillers. These absorption media should also ensure improved heat transfer.

Absorption media have now been found which, surprisingly, exhibit a low corrosiveness towards aluminium and ensure particularly good heat transfer.

DETAILED DESCRIPTION OF THE INVENTION

The present invention accordingly relates in a first aspect to a process for dehumidifying a moist gas mixture G, in particular moist air, in an apparatus $V_1$, comprising the steps of:

(a) contacting the moist gas mixture G with a liquid absorption medium $A_{VE}$ comprising at least one salt selected from the group consisting of $Q^+(RO)_2PO_2^-$, $(Q^+)_2ROPO_3^{2-}$, $Q^+M^+ROPO_3^{2-}$, wherein the liquid absorption medium $A_{VE}$ at least partially absorbs water from the moist gas mixture G, to obtain a liquid absorption medium $A_{VE1}$ having an elevated water content compared to the liquid absorption medium $A_{VE}$ and a gas mixture $G_1$ having a relatively low water content compared to the moist gas mixture G, (b) at least partially removing water from the liquid absorption medium $A_{VE1}$ to obtain a liquid absorption medium $A_{VE2}$ having a relatively low water content compared to the liquid absorption medium $A_{VE1}$, wherein the apparatus $V_1$ at least partially comprises a surface made of an aluminium material of construction $O_{Al}$ and in the apparatus $V_1$ at least one of the liquid absorption media selected from the group consisting of $A_{VE}$, $A_{VE1}$, $A_{VE2}$ contacts the surface made of an aluminium material of construction $O_{Al}$ via at least one contact surface, characterized in that $Q^+$ is a 1,3-dialkylimidazolium where the alkyl groups are independently of one another unbranched or branched $C_1$-$C_6$ alkyl groups, R is an unbranched or branched $C_2$-$C_6$ alkyl group, and $M^+$ is an alkali metal ion, preferably selected from the group consisting of $Li^+$, $K^+$, $Na^+$, more preferably selected from the group consisting of $K^+$, $Na^+$, preferably $K^+$.

The gas mixture G is not subject particularly restricted. "Moist" is to be understood as meaning in the context of the invention "comprising water, in particular water vapour". "Dehumidifying" is to be understood as meaning at least partially removing water.

"At least partially" is to be understood as meaning in the context of the invention "partially or completely".

"Moist gas mixture G" is accordingly to be understood as meaning in the context of the invention that the gas mixture G comprises water, preferably water vapour ("water vapour" is to be understood as meaning water in the gaseous physical state), and that its composition is otherwise not particularly restricted. The water content of this moist gas mixture is not particularly restricted and is in particular from 0.01 vol % to 99.99 vol % ("vol %" indicates the volume of water vapour based on the overall volume of moist gas mixture G). The composition of the moist gas G may otherwise vary depending on the application of the process according to the invention. The moist gas mixture G is in particular selected from moist natural gas, moist air (this may be moist indoor air or the moist air resulting from evaporation of water in absorption chillers), preferably moist air. For moist natural gas the water content is in particular from 0.01 vol % to 15.00 vol %, for moist air said content is in particular from 0.01 vol % to 5.00 vol % in the case of moist indoor air or in particular from 95.00 vol % to 99.99 vol % which is the preferred range when moist air resulting from evaporation of water in absorption chillers is concerned.

The process according to the invention is carried out in an apparatus $V_1$. The apparatus $V_1$ is restricted only to the extent that it shall be suitable for carrying out the process according to the invention. It is in particular possible to employ an apparatus $V_1$ having the following components:

(i) at least one water absorption unit $W_{abs1}$ set up for contacting the moist gas mixture with the liquid absorption medium $A_{VE}$, (ii) at least one water desorption unit $W_{des1}$ which comprises a heat exchanger $W_{x1}$ and is set up for at least partially removing water from a liquid absorption medium $A_{VE}$, (iii) and a circuit $U_1$ which connects the water absorption unit $W_{abs1}$ with the water desorption unit $W_{des1}$ and by means of which the liquid absorption medium $A_{VE}$ may be circulated.

The water absorption unit $W_{abs1}$ is the component in which step a) of the process according to the invention in particular is carried out. Employable as water absorption unit $W_{abs1}$ are in particular the water absorbers known to those skilled in the art. Said absorbers are based on the principle of increasing the surface area of the liquid absorption medium $A_{VE}$ and simultaneously achieving the longest possible residence time of the liquid absorption medium $A_{VE}$ in the water absorber during absorption of water. It is in particular possible here to employ water absorbers selected from the group of: packed beds, spray columns, falling-films, bubble columns, tray columns, wet scrubbers (for example Venturi scrubbers), stirred tanks and combinations of these absorbers. It is particularly preferable to employ as water absorbers falling-films, in particular shell and tube falling-films. The water absorption unit $W_{abs1}$ may in particular also comprise an additional heat exchanger $W_{z1}$ set up such that the liquid absorption medium $A_{VE}$ is coolable.

The water desorption unit $W_{des1}$ which comprises a heat exchanger $W_{x1}$ is the unit in which step b) of the process according to the invention in particular is carried out. The water desorption unit $W_{des1}$ is based on the principle of supplying heat to the water-laden liquid absorption medium $A_{VE}$, increasing the surface area of the water-laden liquid absorption medium $A_{VE}$ and simultaneously achieving the longest possible residence time of the water-laden liquid absorption medium $A_{VE}$ in the water desorption unit.

Employable as water desorption unit $W_{des1}$ comprising a heat exchanger $W_{x1}$ are in particular the combinations of heat exchanger and water desorber known to those skilled in the art, in particular horizontal tube evaporators having an upstream heat exchanger, in particular shell and tube heat exchangers, plate and frame heat exchangers. In addition the water desorption unit $W_{des1}$ comprising a heat exchanger $W_{x1}$ may also be a water desorber having an integrated heat exchanger. Such water desorbers having an integrated heat exchanger are in particular climbing film evaporators, long tube vertical evaporators, short tube vertical evaporators, forced circulation evaporators, agitated thin film evaporators. It is particularly preferable to employ as water desorption unit $W_{des1}$ falling-films, in particular shell and tube falling-films.

Circuit $U_1$ in particular passes $A_{VE1}$ from step a) of the process according to the invention from the water absorption unit $W_{abs1}$ to the water desorption unit $W_{des1}$ and more preferably—in particular when the process according to the invention is carried out in continuous fashion—additionally passes $A_{VE2}$ from step b) of the process according to the invention from the water absorption unit $W_{des1}$ to the water desorption unit $W_{abs1}$.

The circuit $U_1$ is in particular a conduit, in particular selected from the group consisting of tube, hose.

In a further preferred embodiment the circuit $U_1$ also comprises a pump.

A first step of the process according to the invention comprises contacting the moist gas mixture G with a liquid absorption medium $A_{VE}$ comprising at least one salt selected from the group consisting of $Q^+(RO)_2PO_2^-$, $(Q^+)_2ROPO_3^{2-}$, $Q^+M^+ROPO_3^{2-}$. The contacting may be effected in any way known to those skilled in the art, in particular in a water absorption unit $W_{abs1}$. The contacting causes the absorption medium $A_{VE}$ to at least partially absorb moisture, i.e. water, from the moist gas stream G to afford a liquid absorption medium $A_{VE1}$ having an elevated water content compared to the liquid absorption medium $A_{VE}$ and a gas mixture $G_1$ having a relatively low water content compared to the moist gas mixture G.

It is preferable to cool the absorption medium $A_{VE}$ during contacting of the moist gas mixture G in order that as much moisture as possible is absorbed from the moist gas mixture G. This may be achieved, for example, via an additional heat exchanger $W_{z1}$ in the water absorption unit $W_{abs1}$. The temperature of the absorption medium $A_{VE}$ during contacting of the moist gas mixture G is thus preferably in the range of from 15° C. to 90° C., more preferably from 20° C. to 80° C., most preferably from 20° C. to 40° C.

The absorption medium $A_{VE}$ comprises at least one salt selected from the group consisting of $Q^+(RO)_2PO_2^-$, $(Q^+)_2ROPO_3^{2-}$, $Q^+M^+ROPO_3^{2-}$, wherein $Q^+$ is a 1,3-dialkylimidazolium where the alkyl groups are independently of one another unbranched or branched $C_1$-$C_6$ alkyl groups, R is an unbranched or branched $C_2$-$C_6$ alkyl group and $M^+$ is an alkali metal ion preferably selected from the group consisting of $Li^+$, $K^+$, $Na^+$, more preferably selected from the group consisting of $K^+$, $Na^+$, preferably $K^+$.

In a preferred embodiment R is selected from the group consisting of ethyl group, n-propyl group, isopropyl group, n-butyl group, sec-butyl group, tert-butyl group, n-pentyl group, 2-pentyl group, 3-pentyl group, 2-methylbutyl group, 3-methylbutyl group, 3-methylbut-2-yl group, 2-methylbut-2-yl group, 2-dimethylpropyl group, n-hexyl group. R is preferably selected from the group consisting of ethyl group, n-propyl group, isopropyl group, n-butyl group, sec-butyl group, tert-butyl group, n-pentyl group, n-hexyl group; R is more preferably selected from the group consisting of ethyl group, n-butyl group. In a very particularly preferred embodiment of the present invention R=ethyl group. This is because it has now been found that, surprisingly, imidazolium salts where R=ethyl group have a particularly small contact angle and thus ensure particularly good surface wetting. This results in a relatively large contact area, thus also in fewer nonwetted spaces and thus in improved heat transfer inside the apparatus $V_1$ and thus also in a particularly efficient process.

$Q^+$ is in particular selected from the group consisting of 1,3-dimethylimidazolium, 1,3-diethylimidazolium, 1-ethyl-3-methylimidazolium, 1-n-butyl-3-methylimidazolium. $Q^+$ is preferably selected from the group consisting of 1,3-diethylimidazolium, 1-ethyl-3-methylimidazolium, 1-n-butyl-3-methylimidazolium. $Q^+$ is more preferably selected from the group consisting of 1-ethyl-3-methylimidazolium, 1-n-butyl-3-methylimidazolium. $Q^+$ is even more preferably 1-ethyl-3-methylimidazolium.

The liquid absorption medium $A_{VE}$ may be employed in the form of the pure salts of the structure $Q^+(RO)_2PO_2^-$, $(Q^+)_2ROPO_3^{2-}$ and $Q^+M^+ROPO_3^{2-}$. Alternatively and more preferably the liquid absorption medium $A_{VE}$ is an aqueous solution in which the total weight of all salts of structure $Q^+(RO)_2PO_2^-$, $(Q^+)_2ROPO_3^{2-}$ and $Q^+M^+ROPO_3^{2-}$ is at least 70 wt % based on the total weight of the aqueous solution. It is yet more preferable when the total weight of all salts of the structure $Q^+(RO)_2PO_2^-$, $(Q^+)_2ROPO_3^{2-}$ and $Q^+M^+ROPO_3^{2-}$ is at least 80 wt % based on the total weight of the aqueous solution, yet more preferably 85 wt %, yet more preferably 90 wt %.

The gas mixture $G_1$ obtained in the first step of the process according to the invention and having a relatively low water content compared to the moist gas mixture G then represents the dehumidified gas stream which, depending on the application, can be returned to living or working spaces in the form of dehumidified air or in the case of natural gas can be supplied to power generation.

The absorption medium $A_{VE1}$ obtained in the first step of the process according to the invention has an elevated water content compared to the liquid absorption medium $A_{VE}$. It will be appreciated that $A_{VE1}$, in terms of the salts comprised in it and selected from the group consisting of $Q^+(RO)_2PO_2^-$, $(Q^+)_2ROPO_3^{2-}$, $Q^+M^+ROPO_3^{2-}$, is identical to $A_{VE}$ and is preferably distinguished therefrom only by the water content.

A second step of the process according to the invention comprises at least partially removing water from the liquid absorption medium $A_{VE1}$ to obtain a liquid absorption medium $A_{VE2}$ having a relatively low water content compared to the liquid absorption medium $A_{VE1}$. This additionally comprises supplying heat to the liquid absorption medium $A_{VE1}$. The supply of heat and the at least partial removal may be effected in any way known to those skilled in the art, in particular in a water desorption unit $W_{des1}$ comprising a heat exchanger $W_{x1}$. The at least partial removal of water from the liquid absorption medium $A_{VE1}$ affords a liquid absorption medium $A_{VE2}$ having a relatively low water content compared to the liquid absorption medium $A_{VE1}$.

It will be appreciated that $A_{VE2}$, in terms of the salts comprised in it and selected from the group consisting of $Q^+(RO)_2PO_2^-$, $(Q^+)_2ROPO_3^{2-}$, $Q^+M^+ROPO_3^{2-}$, is identical to $A_{VE1}$ and is preferably distinguished therefrom only by the water content.

An essential feature of the process according to the invention is that the apparatus $V_1$ at least partially comprises a surface made of an aluminium material of construction $O_{Al}$ (in the context of the invention $O_{Al}$ is an abbreviation for "surface made of an aluminium material of construction").

An aluminium material of construction in the context of the present invention is to be understood as meaning both unalloyed aluminium and aluminium alloys where in particular the mass fraction of aluminium is greater than the mass fraction of every other element. The aluminium material of construction is preferably unalloyed aluminium.

Unalloyed aluminium is in particular highest purity aluminium having a purity of >99.0 wt %, more preferably >99.9 wt %.

Aluminium alloys comprise in addition to the aluminium in particular at least one alloying metal selected from the group consisting of magnesium, manganese, silicon, zinc, lead, copper, titanium, iron, more preferably selected from the group consisting of magnesium, manganese, silicon, zinc, lead, copper, titanium. The aluminium material of construction may in particular be in the form of a wrought alloy or of a cast alloy.

A further essential feature of the process according to the invention is that in the apparatus $V_1$ at least one of the liquid absorption media selected from the group consisting of $A_{VE}$, $A_{VE1}$, $A_{VE2}$ contacts the surface made of an aluminium material of construction $O_{Al}$ via at least one contact surface. This is to be understood as meaning that at this contact surface the liquid absorption medium $A_{VE}$ is in direct contact with the surface made of an aluminium material of construction $O_{Al}$. In the context of the present invention "in direct contact" is to be understood as meaning "wetting". It will be appreciated that the liquid absorption medium selected from the group consisting of $A_{VE}$, $A_{VE1}$, $A_{VE2}$ and the aluminium comprised in the contact surface are thus in direct contact. The aluminium comprised in the contact surface is not particularly restricted and is in particular selected from the group consisting of elemental aluminium or aluminium compounds such as in particular passivated aluminium (where passivated aluminium is to be understood as meaning in particular aluminium oxide).

In the embodiment according to the invention in which an apparatus $V_1$ is employed and comprises the following components:

(i) at least one water absorption unit $W_{abs1}$ set up for contacting the moist gas mixture with the liquid absorption medium $A_{VE}$, (ii) at least one water desorption unit $W_{des1}$ which comprises a heat exchanger $W_{x1}$ and is set up for at least partially removing water from a liquid absorption medium $A_{VE}$, (iii) and a circuit $U_1$ which connects the water absorption unit $W_{abs1}$ with the water desorption unit $W_{des1}$ and by means of which the liquid absorption medium $A_{VE}$ may be circulated, the contact surface at which the liquid absorption medium selected from the group consisting of $A_{VE}$, $A_{VE1}$, $A_{VE2}$ contacts the surface made of an aluminium material of construction $O_{Al}$, is disposed in particular in at least one of the components selected from the group water absorption unit $W_{abs1}$, water desorption unit $W_{des1}$, circuit $U_1$, preferably in at least one of the components selected from the group water absorption unit $W_{abs1}$, water desorption unit $W_{des1}$.

This is because it has now been found that, surprisingly, the salts according to the invention bring about a particularly low level of aluminium corrosion and are thus particularly suitable as liquid absorption media in the apparatus $V_1$ having a surface made of an aluminium material of construction $O_{Al}$, in which one of the absorption media selected from the group consisting of $A_{VE}$, $A_{VE1}$, $A_{VE2}$ is in direct contact with the surface made of an aluminium material of construction $O_{Al}$.

In a further preferred embodiment the process according to the invention is carried out in continuous fashion. This is to be understood as meaning in particular that following step b) the steps a) and b) are performed at least one more time and that the liquid absorption medium $A_{VE}$ employed the steps a) additionally performed in each case is at least partially the liquid absorption medium $A_{VE2}$ obtained from the step b) performed immediately beforehand, i.e. in particular the water content of the liquid absorption medium $A_{VE}$ employed in the step a) additionally performed in each case and of the liquid absorption medium $A_{VE2}$ from the immediately preceding step b) is identical.

It is more preferable when this embodiment comprises heating liquid absorption medium $A_{VE1}$ with heat from liquid absorption medium $A_{VE2}$. This may be carried out in an additional heat exchanger $W_{y1}$, in particular selected from the group consisting of shell and tube heat exchangers and plate and frame heat exchangers. This makes it possible to carry out the process according to the invention in a particularly energy efficient fashion.

The invention also relates in a further aspect to an apparatus $V_2$ for dehumidifying a moist gas mixture, in particular moist air, comprising the components (i) a liquid absorption medium $A_{VO}$ comprising at least one salt selected from the group consisting of $Q^+(RO)_2PO_2^-$, $(Q^+)_2ROPO_3^{2-}$, $Q^+M^+ROPO_3^{2-}$, (ii) at least one water absorption unit $W_{abs2}$ set up for contacting the moist gas mixture with the liquid absorption medium $A_{VO}$, (iii) at least one water desorption unit $W_{des2}$ which comprises a heat exchanger $W_{x2}$ and is set up for at least partially removing water from a liquid absorption medium $A_{VO}$, (iv) and a circuit $U_2$ which connects the water absorption unit $W_{abs2}$ with the water desorption unit $W_{des2}$ and by means of which the liquid absorption medium $A_{VO}$ may be circulated, wherein at least one of the components water absorption unit $W_{abs2}$, water desorption unit $W_{des2}$, circuit $U_2$ at least partially comprises a surface made of an aluminium material of construction $O_{Al}$, and wherein disposed in the apparatus $V_2$ is at least one contact surface at which the liquid absorption medium $A_{VO}$ contacts the surface made of an aluminium material of construction $O_{Al}$, characterized in that $Q^+$ is a 1,3-dialkylimidazolium where the alkyl groups are independently of one another unbranched or branched $C_1$-$C_6$ alkyl groups, R is an unbranched or branched $C_2$-$C_6$ alkyl group, and $M^+$ is an alkali metal ion, preferably selected from the group consisting of $Li^+$, $K^+$, $Na^+$, more preferably selected from the group consisting of $K^+$, $Na^+$, preferably $K^+$.

The apparatus according to the invention $V_2$ is suitable for dehumidifying a moist gas mixture, in particular moist air. Said apparatus comprises the following components:

As a first component the apparatus $V_2$ according to the invention comprises a liquid absorption medium $A_{VO}$ which comprises at least one salt selected from the group consisting of $Q^+(RO)_2PO_2^-$, $(Q^+)_2ROPO_3^{2-}$, $Q^+M^+ROPO_3^{2-}$, where $Q^+$ is a 1,3-dialkylimidazolium where the alkyl groups are independently of one another unbranched or branched $C_1$-$C_6$ alkyl groups, R is an unbranched or branched $C_2$-$C_6$ alkyl group and $M^+$ is an alkali metal ion preferably selected from the group consisting of $Li^+$, $K^+$, $Na^+$, more preferably selected from the group consisting of $K^+$, $Na^+$, preferably $K^+$.

In a preferred embodiment R is selected from the group consisting of ethyl group, n-propyl group, isopropyl group, n-butyl group, sec-butyl group, tert-butyl group, n-pentyl group, 2-pentyl group, 3-pentyl group, 2-methylbutyl group, 3-methylbutyl group, 3-methylbut-2-yl group, 2-methylbut-2-yl group, 2-dimethylpropyl group, n-hexyl group. R is preferably selected from the group consisting of ethyl group, n-propyl group, isopropyl group, n-butyl group, sec-butyl group, tert-butyl group, n-pentyl group, n-hexyl group; R is more preferably selected from the group consisting of ethyl group, n-butyl group. In a very particularly preferred embodiment of the present invention R=ethyl group. This is because it has now been found that, surprisingly, imidazolium salts where R=ethyl group have a particularly small contact angle and thus ensure particularly good surface wetting. This results in a relatively large contact area, thus also in fewer nonwetted spaces and thus in improved heat transfer inside the apparatus $V_2$ and thus also in a particularly efficient process.

$Q^+$ is in particular selected from the group consisting of 1,3-dimethylimidazolium, 1,3-diethylimidazolium, 1-ethyl-3-methylimidazolium, 1-n-butyl-3-methylimidazolium. $Q^+$ is preferably selected from the group consisting of 1,3-diethylimidazolium, 1-ethyl-3-methylimidazolium, 1-n-butyl-3-methylimidazolium. $Q^+$ is more preferably selected from the group consisting of 1-ethyl-3-methylimidazolium, 1-n-butyl-3-methylimidazolium. $Q^+$ is even more preferably 1-ethyl-3-methylimidazolium.

The liquid absorption medium $A_{VO}$ may be employed in the form of the pure salts of the structure $Q^+(RO)_2PO_2^-$, $(Q^+)_2ROPO_3^{2-}$ and $Q^+M^+ROPO_3^{2-}$. Alternatively and more preferably the liquid absorption medium $A_{VO}$ is an aqueous solution in which the total weight of all salts of structure $Q^+(RO)_2PO_2^-$, $(Q^+)_2ROPO_3^{2-}$ and $Q^+M^+ROPO_3^{2-}$ is at least 70 wt % based on the total weight of the aqueous solution. It is yet more preferable when the total weight of all salts of the structure $Q^+(RO)_2PO_2^-$, $(Q^+)_2ROPO_3^{2-}$ and $Q^+M^+ROPO_3^{2-}$ is at least 80 wt % based on the total weight of the aqueous solution, yet more preferably 85 wt %, yet more preferably 90 wt %.

As a second component the apparatus $V_2$ according to the invention comprises a water absorption unit $W_{abs2}$ set up for contacting the moist gas mixture with the liquid absorption medium $A_{VO}$. The water absorption unit $W_{abs2}$ may in particular comprise an additional heat exchanger $W_{z2}$ set up such that the liquid absorption medium $A_{VO}$ is coolable. Employable as such a water absorption unit $W_{abs2}$ are in particular the water absorbers known to those skilled in the art. Said absorbers are based on the principle of increasing the surface area of the liquid absorption medium $A_{VO}$ and simultaneously achieving the longest possible residence time of the liquid absorption medium $A_{VO}$ in the water absorber during absorption of water. It is in particular possible here to employ water absorbers selected from the group of: packed beds, spray columns, falling-films, bubble columns, tray columns, wet scrubbers (for example Venturi scrubbers), stirred tanks and combinations of these absorbers. It is particularly preferable to employ as water absorbers falling-films, in particular shell and tube falling-films.

As a third component the apparatus $V_2$ according to the invention comprises a water desorption unit $W_{des2}$ which comprises a heat exchanger $W_{x2}$ and is set up for at least partially removing water from the liquid absorption medium $A_{VO}$. Employable therefor are in particular the combinations of heat exchanger and water desorber known to those skilled in the art. The water desorption unit $W_{des2}$ is based on the principle of supplying heat to the liquid absorption medium $A_{VO}$, increasing the surface area of the liquid absorption medium $A_{VO}$ and simultaneously achieving the longest possible residence time of the liquid absorption medium $A_{VO}$ in the water desorption unit.

Employable as water desorption unit $W_{des2}$ comprising a heat exchanger $W_{x1}$ are in particular the combinations of heat exchanger and water desorber known to those skilled in the art, in particular horizontal tube evaporators having an upstream heat exchanger, in particular shell and tube heat exchangers, plate and frame heat exchangers. In addition the water desorption unit $W_{des2}$ comprising a heat exchanger $W_{x2}$ may also be a water desorber having an integrated heat exchanger. Such water desorbers having an integrated heat exchanger are in particular climbing film evaporators, long tube vertical evaporators, short tube vertical evaporators, forced circulation evaporators, agitated thin film evaporators. It is particularly preferable to employ as water desorption unit $W_{des2}$ falling-films, in particular shell and tube falling-films.

As a fourth component the apparatus $V_2$ according to the invention comprises a circuit $U_2$ which connects the water absorption unit $W_{abs2}$ with the water desorption unit $W_{des2}$ and by means of which the liquid absorption medium $A_{VO}$ may be circulated. The circuit $U_2$ is preferably a conduit, more preferably selected from the group consisting of tube, hose. In a further preferred embodiment the circuit $U_2$ also comprises a pump.

An essential feature of the apparatus $V_2$ according to the invention is that said apparatus at least partially comprises a surface made of an aluminium material of construction $O_{Al}$ (in the context of the invention $O_{Al}$ is an abbreviation for "surface made of an aluminium material of construction").

An aluminium material of construction in the context of the present invention is to be understood as meaning both unalloyed aluminium and aluminium alloys where in particular the mass fraction of aluminium is greater than the mass fraction of every other element. The aluminium material of construction is preferably unalloyed aluminium.

Unalloyed aluminium is in particular highest purity aluminium having a purity of >99.0 wt %, more preferably >99.9 wt %.

Aluminium alloys comprise in addition to the aluminium in particular at least one alloying metal selected from the group consisting of magnesium, manganese, silicon, zinc, lead, copper, titanium, iron, more preferably selected from the group consisting of magnesium, manganese, silicon, zinc, lead, copper, titanium. The aluminium material of construction may in particular be in the form of a wrought alloy or of a cast alloy.

A further essential feature of the apparatus $V_2$ according to the invention is that disposed in said apparatus is a contact surface at which the liquid absorption medium $A_{VO}$ contacts the surface made of an aluminium material of construction $O_{Al}$. This is to be understood as meaning that at this contact surface the liquid absorption medium $A_{VO}$ is in direct contact with the surface made of an aluminium material of construction $O_{Al}$. In the context of the present invention "in direct contact" is to be understood as meaning "wetting". It will be appreciated that the liquid absorption medium $A_{VO}$ and the aluminium comprised in the contact surface are thus in direct contact. The aluminium comprised in the contact surface is not particularly restricted and is in particular selected from the group consisting of elemental aluminium or aluminium compounds such as in particular passivated aluminium (where passivated aluminium is to be understood as meaning in particular aluminium oxide).

In a preferred embodiment the apparatus $V_2$ comprises a further heat exchanger $W_{y2}$ (additional to the heat exchanger $W_{x2}$ comprised in the water desorption unit $W_{des2}$). The heat exchanger $W_{y2}$ is set up such that liquid absorption medium $A_{VO}$ sent from the water absorption unit $W_{abs2}$ to the water desorption unit $W_{des2}$ is suppliable with heat from liquid absorption medium $A_{VO}$, said medium being conducted away from the water desorption unit $W_{des2}$. This can be ensured by employing as heat exchanger $W_{y2}$ in particular a heat exchanger selected from shell and tube heat exchangers, plate and frame heat exchangers.

In a further preferred embodiment of the invention the apparatus $V_2$ is part of an absorption chiller. This absorption chiller then comprises as further components a condenser, an evaporator and a coolant, wherein the coolant is water.

The condenser is in particular connected to the water desorption unit $W_{des2}$ via a conduit and is set up for condensing water at least partially removed from the liquid absorption medium $A_{VO}$ in the water desorption unit $W_{des2}$. The condenser preferably also comprises a cooling water circuit.

The evaporator is in particular connected to the condenser via a conduit (which may comprise a throttling means) and connected to the water absorption unit $W_{abs2}$ via a further conduit and is set up for evaporating condensed water from the condenser. The evaporator preferably also comprises a pressure of <1 bar, more preferably <0.1 bar, to permit evaporation of the condensed water at the lowest possible temperatures. The evaporator may further preferably additionally comprise an apparatus from which heat may be drawn and so that the condensed water may be evaporated (for example a coolant conduit in which coolant is passed into the space in which water is evaporated).

The FIGS. 1 and 2 elucidated hereinbelow show preferred embodiments of the process according to the invention and the apparatus according to the invention.

FIG. 1 (abbreviated to "FIG. 1") shows an embodiment of the apparatus $V_2/V_1$ according to the invention.

The apparatus $V_2$ shown in FIG. 1 comprises a water absorption unit $W_{abs2}$ <103> (with optional additional heat exchanger $W_{z2}$ <104>) to which a conduit <101> leads and from which a conduit <102> leads away, a water desorption unit $W_{des2}$ which comprises a heat exchanger $W_{x2}$ <108> and a water desorber <109> and to which conduit <111> leads and from which conduits <110>, <112> and <113> lead away, and a circuit $U_2$ formed from conduits <106>, <111> and <113> or <106>, <111>, <112> and <105> (in each case optionally with conduit <114>). The apparatus in FIG. 1 may also optionally comprise a further heat exchanger $W_{y2}$ <107> to which conduits <106> and <112> lead and from which conduits <105> and <111> lead away. In addition the apparatus also comprises a liquid absorption medium $A_{VO}$. Said medium is disposed in one or more of the abovementioned components water absorption unit $W_{abs2}$, water desorption unit $W_{des2}$, circuit $U_2$. Water absorption unit $W_{abs2}$ <103> may optionally also comprise an additional heat exchanger $W_{z2}$ <104>. Apparatus $V_2$, in particular at least one of the components selected from the group consisting of water absorption unit $W_{abs2}$, water desorption unit $W_{des2}$, circuit $U_2$, at least partially comprises a surface made of an aluminium material of construction $O_{Al}$ and there is at least one contact surface at which the liquid absorption medium $A_{VO}$ contacts the surface made of an aluminium material of construction $O_{Al}$. Optionally circuit $U_2$ may also additionally comprise a pump for conveying the liquid absorption medium.

Figure 2:
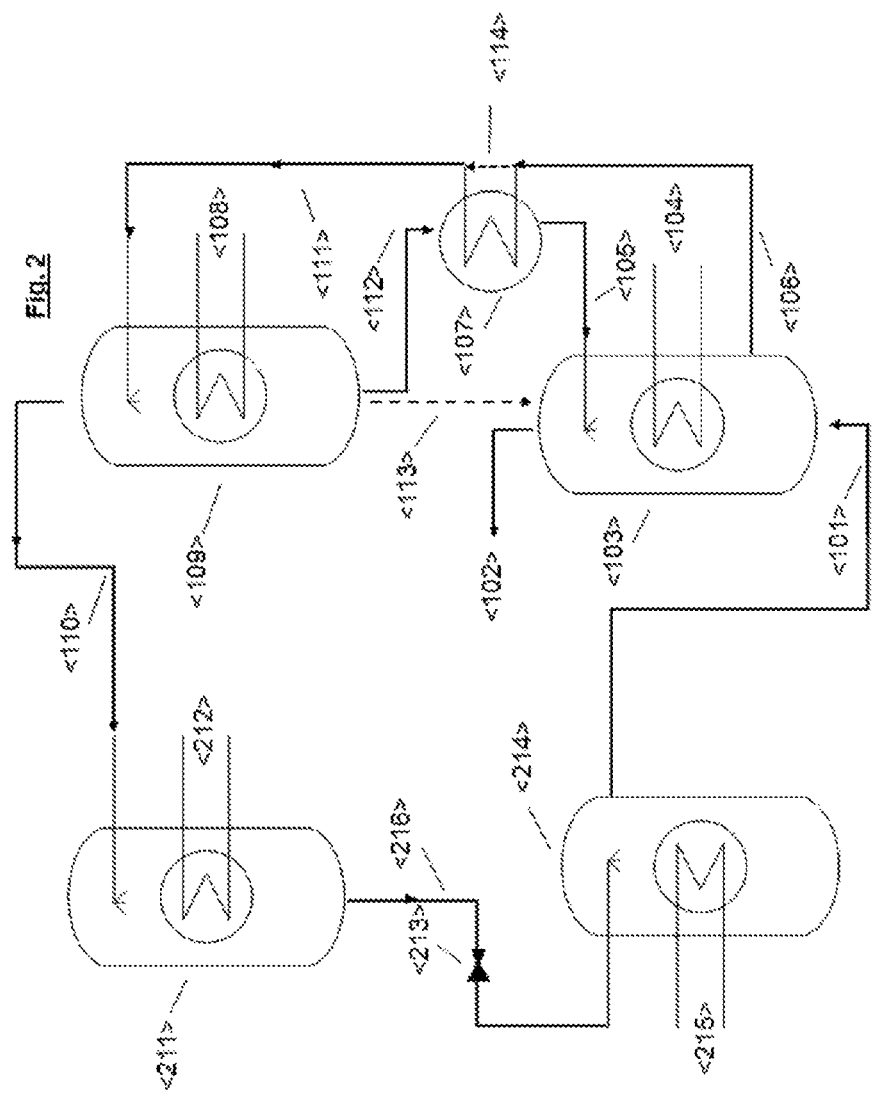

Apparatus $V_1$ corresponds to apparatus $V_2$ without absorption medium $A_{VO}$, wherein in the figure description for FIG. 1 and FIG. 2 the terms $U_2$, $W_{abs2}$, $W_{des2}$, $W_{x2}$, $W_{y2}$, $W_{z2}$ are to be replaced by $U_1$, $W_{abs1}$, $W_{des1}$, $W_{x1}$, $W_{y1}$, and $W_{z1}$ respectively.

The process according to the invention will now be illustratively described with reference to apparatus $V_1$ using FIG. 1:

A stream moist gas mixture G (said stream may moist air, moist natural gas or moist gas mixture originating from the evaporator of an absorption chiller—see also FIG. 2 with regard to this option) is supplied via conduit <101> to a water absorption unit $W_{abs1}$ <103> and contacted there with the liquid absorption medium $A_{VE}$ supplied to the water absorption unit $W_{abs1}$ <103> via the conduit <105> or via the conduit <113>. The water absorption unit $W_{abs1}$ <103> may be any of the water absorbers cited hereinabove for $W_{abs1}$, in particular a falling-film. Contacting, in the water absorption unit $W_{abs1}$ <103>, gas mixture G supplied via conduit <101> with the liquid absorption medium $A_{VE}$ supplied via the conduit <105> or via the conduit <113> affords a liquid absorption medium $A_{VE1}$ having an elevated water content compared to the liquid absorption medium $A_{VE}$ and a stream of a gas mixture $G_1$ discharged via the conduit <102>, $G_1$ having a relatively low water content compared to the moist gas mixture G. Depending on the application $G_1$ is in particular dehumidified air or dehumidified natural gas. The water absorption unit $W_{abs1}$ <103> may optionally also comprise an additional heat exchanger $W_{z1}$ <104>. Preferably via the conduits <106>, <111> and the heat exchanger $W_{y1}$ <107> (or, when heat exchanger $W_{y1}$ <107> is not employed, via conduits <106>, <111> and <114>) the liquid absorption medium $A_{VE1}$ is then passed to the water desorption unit $W_{des1}$ composed of the heat exchanger $W_{x1}$ <108> and the water desorber <109>. The water-laden liquid absorption medium $A_{VE1}$ may additionally be supplied with heat in the optional heat exchanger $W_{y1}$ <107>. The at least partial removal of water from liquid absorption medium $A_{VE1}$ is then carried out in the water desorber <109> to afford a liquid absorption medium $A_{VE2}$ having a relatively low water content compared to the liquid absorption $A_{VE1}$. The water removed is then discharged from the water desorber <109> as liquid or vapour, preferably as vapour, via conduit <110>. The liquid absorption medium $A_{VE2}$ is then discharged from the water desorber <109> and returned to the water absorption unit $W_{abs1}$ <103>. This may either be carried out directly, i.e. via the conduit <113> which is shown in dashed form in FIG. 1. Alternatively and preferably the liquid absorption medium $A_{VE2}$ may also be supplied via the conduit <112> to the optional heat exchanger $W_{y1}$ <107> in which the liquid absorption medium $A_{VE1}$ supplied via conduit <106> to the optional heat exchanger $W_{y1}$ <107> is supplied with heat from the liquid absorption medium $A_{VE2}$ supplied via conduit <112> to the optional heat exchanger $W_{y1}$ <107>. Once the concentrated liquid absorption medium $A_{VE2}$ has been supplied to the water absorption unit $W_{abs1}$ via conduit <105> or <113> said medium is reused as $A_{VE}$ for at least partially dehumidifying the gas stream in a new cycle. It is essential to the invention that in this process the apparatus according to FIG. 1, preferably at least one of the components selected from the group consisting of water absorption unit $W_{abs1}$ <103> (in FIG. 1 said unit comprises the heat exchanger <104>), water desorption unit $W_{des1}$ (in FIG. 1 said unit comprises the heat exchanger <108>), circuit $U_1$ (composed in FIG. 1 of the conduits <106>, <111>, <113>, or <106>, <111>, <112>, <105>, and in each case optionally also conduit <114>) at least partially comprises a surface made of an aluminium material of construction $O_{Al}$ and that disposed in the apparatus is at least one contact surface at which at least one of the liquid absorption media $A_{VE}$, $A_{VE1}$, $A_{VE2}$ contacts the surface made of an aluminium material of construction $O_{Al}$.

FIG. 2 (abbreviated as "FIG. 2") shows in schematic fashion an absorption chiller into which an apparatus $V_2$ is integrated. The constituents <101> to <114> are shown as for the apparatus $V_2$ described in FIG. 1. Additionally, the absorption chiller in FIG. 2 also comprises a condenser <211> which is connected to the water desorption unit $W_{des2}$ <109> via the conduit <110> and is set up for condensing water at least partially removed from the liquid absorption medium $A_{VO}$ in the water desorption unit $W_{des2}$. Condenser <211> preferably also comprises a heat exchanger <212> with which cooling water may be supplied.

The absorption chiller shown in FIG. 2 also comprises an evaporator <214> connected to the condenser <211> via a conduit <216> (which may optionally comprise a throttling means <213>) and connected via the conduit <101> with the water absorption unit $W_{abs2}$. The evaporator <214> is set up to evaporate condensed water from the condenser. Additionally, the evaporator <214> can further preferably also comprise a heat exchanger <215> which supplies a medium, heat being drawn off from the medium to thus evaporate the condensed water (for example a coolant conduit with, in particular, water as coolant, this coolant being passed into the evaporator <214>).

In an embodiment of the process according to the invention (described hereinbelow with reference to apparatus $V_1$ using FIG. 2) moist gas mixture G originating from evaporator <214> is passed via the conduit <101> to the water absorption unit $W_{abs1}$ <103>. The water removed in water desorption unit $W_{des1}$ is supplied via the conduit <110> to the condenser <211> in which said water is recondensed. A cooling water circuit as heat exchanger <212> installed in the condenser is optionally likewise used therefor. The condensed water is then supplied via a conduit <216> to the evaporator <214> in which the evaporation of water is effected in particular at low pressures thus bringing about a cooling effect. This may optionally also be effected using a throttling means <213>. This achieves a cooling action in the evaporator <214> and, for example, coolant may be cooled via the heat exchanger <215>. The water vapour generated is then returned to the water absorption unit $W_{abs1}$ <103> via conduit <101>.

The examples which follow are intended to elucidate the present invention without limiting said invention in any way.

EXAMPLES

The following test series were carried out:

1. Test Series: E1, V1-V4

1.1 Chemicals Employed EMIM DEP (=ethylmethylimidazolium diethylphosphate) was obtained from Sigma Aldrich.

EMIM $HSO_4$ (=ethylmethylimidazolium hydrogensulphate) was obtained from Sigma Aldrich.

LiCl was obtained from Sigma Aldrich.

$MMIM^+H^+$ $ROPO_3^{2-}$ where R=ethyl group (dimethylimidazolium hydrogen monoethylphosphate) was obtained as follows:

Added to a cryostat at −5° C. were methylamine (4.8 mol), formaldehyde (2.4 mol) and monoethyl phosphate (2.4 mol). The mixture was stirred for 1 h before glyoxal (2.4 mol) was added. The volatile constituents were subsequently removed under reduced pressure using a rotary evaporator to obtain the pure substance.

1.2 Test Procedure

At 70° C. and under air, aluminium plates (highest purity aluminium, purity >99.0%) having dimensions of 3 cm×7 cm and a thickness of 3 mm were immersed in 350 ml of the respective solution. The liquid was stirred during the test to ensure uniform flow of the liquid around the metal plates. Determination of the removal rates (removal rate="loss due to corroded aluminium", reported in Table 1 in the unit g/m$^2$*year) was carried out gravimetrically after chemical and mechanical removal of the corrosion products from the immersed aluminium plates. The results are shown in Table 1 which follows.

1.3 Results

TABLE 1

| test | solution employed | removal rate |
|---|---|---|
| V1 | EMIM $HSO_4$ (80 wt % in $H_2O$) | 7548 |
| V2 | LiCl (30 wt % in $H_2O$) | 575 |
| V3 | $H_2O$ | 130 |
| V4 | $MMIM^+$ $H^+$ $ROPO_3^{2-}$ where R = ethyl (80 wt % in $H_2O$) | 353 |
| E1 | EMIM DEP (80 wt % in $H_2O$) | 33 |

As is apparent from the results in Table 1 corrosion is markedly lower when using the liquid absorption medium cited in E1 than for the liquid absorption media employed in V1-V4. The use of liquid absorption media according to the invention thus surprisingly makes it possible to reduce the corrosion of aluminium compared to the liquid absorption media otherwise employed in the prior art.

2. Test Series: E2, E3, V5

This effect is corroborated by the test series which follows.

2.1 Chemicals Employed

EMIM DEP (=ethylmethylimidazolium diethylphosphate) was obtained from Sigma Aldrich.

$MMIM^+K^+ROPO_3^{2-}$ where R=ethyl (=dimethylimidazolium potassium monoethylphosphate) was obtained as follows: Added to a cryostat at −5° C. were methylamine (4.8 mol), formaldehyde (2.4 mol) and monoethyl phosphate (2.4 mol). The mixture was stirred for 1 h before glyoxal (2.4 mol) was added. The volatile constituents were subsequently removed under reduced pressure using a rotary evaporator and the pH of the pure substance thus obtained was adjusted from 7.0 to 7.5 with 50 wt % aqueous potassium hydroxide solution.

MMIM $MeSO_3$ (=dimethylimidazolium methylsulphonate) was obtained as follows: Added to a cryostat at −5° C. were methylamine (4.8 mol), formaldehyde (2.4 mol) and methanesulphonic acid (2.4 mol). The mixture was stirred for 1 h before glyoxal (2.4 mol) was added. The volatile constituents were subsequently removed under reduced pressure using a rotary evaporator to obtain the pure substance.

2.2 Test Procedure

At 70° C. and under air, aluminium plates (highest purity aluminium; purity >99.0%) having dimensions of 3 cm×7 cm and a thickness of 3 mm were immersed in 350 ml of the respective solution. The liquid was stirred during the test to ensure uniform flow of the liquid around the metal plates.

Tests E2, E3, V5 employed wet chemical evaluation by measurement of Al in the medium with ICP-OES (inductively coupled plasma optical emission spectrometry). The determined aluminium content in the solution was extrapolated to the mass of the aluminium plates employed. The results are shown in Table 2 which follows.

2.3 Results

Table 2

TABLE 2

| test | solution employed | mg of dissolved aluminium per g of aluminium |
|---|---|---|
| V5 | MMIM $MeSO_3$ (80 wt % in water) | 1,040 |
| E2 | $MMIM^+$ $K^+$ $ROPO_3^{2-}$ where R = ethyl (80 wt % in water) | 0,001 |
| E3 | EMIM DEP (80 wt % in water) | 0,011 |

As is apparent from the results in Table 2, use of the liquid absorption media according to the invention makes it possible to reduce the corrosion of aluminium compared to the liquid absorption media otherwise employed in the prior art.

3. Test Series E4, E5, V6, V7

3.1 Chemicals Employed

EMIM DEP (=ethylmethylimidazolium diethylphosphate) was obtained from Sigma Aldrich.

EMIM DMP (=ethylmethylimidazolium dimethylphosphate) was obtained from Sigma Aldrich.

3.2 Test Procedure 3 drops of the respective solution were dropped onto an aluminium plate (highest purity aluminium, purity >99.0%) having dimensions of 3 cm×7 cm and a maximum thickness of 3 mm. The contact angle determination was carried out according to SOP 1827. The results are shown in Table 3 which follows.

3.3 Results
Table 3

TABLE 3

| test | solution employed | Contact angle (°) |
|---|---|---|
| E4 | EMIM DEP (90 wt % in water) | 45.7 |
| E5 | EMIM DEP (80 wt % in water) | 53 |
| V6 | EMIM DMP (90 wt % in water) | 86 |
| V7 | EMIM DMP (80 wt % in water) | 90.4 |

The results show that the absorption media according to the invention (E4, E5) exhibit a small contact angle compared to those of the prior art (V6, V7) and thus ensure good heat conduction in the process according to the invention/for the apparatus according to the invention. This is shown in the comparisons of E4 with E6 and E5 with E7. The use of imidazolium salts with diethylphosphate as counterion as opposed to dimethylphosphate as counterion surprisingly achieves a smaller contact angle to the aluminium-containing surface. This results in improved surface wetting and thus to greater and more efficient heat exchange in the case of diethyl phosphate.

The invention claimed is:

1. A process for dehumidifying a moist gas mixture G in an apparatus $V_1$, comprising the steps of:
    (a) contacting the moist gas mixture G with a liquid absorption medium $A_{VE}$ comprising at least one salt selected from the group consisting of: $Q^+(RO)_2PO_2^-$; $(Q^+)_2ROPO_3^{2-}$; and $Q^+M^+ROPO_3^{2-}$; wherein the liquid absorption medium $A_{VE}$ at least partially absorbs water from the moist gas mixture G, to obtain a liquid absorption medium $A_{VE1}$ having an elevated water content compared to the liquid absorption medium $A_{VE}$ and a gas mixture $G_1$ having a relatively low water content compared to the moist gas mixture G;
    (b) at least partially removing water from the liquid absorption medium $A_{VE1}$ to obtain a liquid absorption medium $A_{VE2}$ having a relatively low water content compared to the liquid absorption medium $A_{VE1}$;
    wherein the apparatus $V_1$ at least partially comprises a surface made of an aluminium material of construction $O_{Al}$ and in the apparatus $V_1$, at least one of the liquid absorption media selected from the group consisting of $A_{VE}$, $A_{VE1}$, $A_{VE2}$ contacts the surface made of $O_{Al}$ via at least one contact surface;
    and wherein:
        $Q^+$ is a 1,3-dialkylimidazolium in which the alkyl groups are, independently of one another, unbranched or branched $C_1$-$C_6$ alkyl groups;
        R is an unbranched or branched $C_2$-$C_6$ alkyl group;
        and $M^+$ is an alkali metal ion.

2. The process of claim 1, wherein R is selected from the group consisting of: an ethyl group and a n-butyl group.

3. The process of claim 1, wherein $Q^+$ is selected from the group consisting of 1,3-dimethylimidazolium, 1,3-diethylimidazolium, 1-ethyl-3-methylimidazolium, 1-n-butyl-3-methylimidazolium.

4. The process of claim 3, wherein the salt is selected from the group consisting of: 1,3-diethylimidazolium diethylphosphate; 1-ethyl-3-methylimidazolium diethylphosphate; and 1-n-butyl-3-methylimidazolium di-n-butylphosphate.

5. The process of claim 1, wherein the liquid absorption medium $A_{VE}$ is an aqueous solution in which the total weight of all salts of structure $Q^+(RO)_2PO_2^-$, $(Q^+)_2ROPO_3^{2-}$ and $Q^+M^+ROPO_3^{2-}$ is at least 70 wt % based on the total weight of the aqueous solution.

6. The process of claim 1, wherein said process is carried out in continuous fashion.

7. The process of claim 2, wherein:
    a) $Q^+$ is selected from the group consisting of 1,3-dimethylimidazolium, 1,3-diethylimidazolium, 1-ethyl-3-methylimidazolium, 1-n-butyl-3-methylimidazolium; and
    b) the liquid absorption medium $A_{VE}$ is an aqueous solution in which the total weight of all salts of structure $Q^+(RO)_2PO_2^-$, $(Q^+)_2ROPO_3^{2-}$ and $Q^+M^+ROPO_3^{2-}$ is at least 70 wt % based on the total weight of the aqueous solution.

8. The process of claim 1, wherein said process is carried out using an apparatus $V_2$ for dehumidifying a moist gas mixture, wherein said apparatus comprises the components:
    a) a liquid absorption medium $A_{VO}$ comprising at least one salt selected from the group consisting of: $Q^+(RO)_2PO_2^-$; $(Q^+)_2ROPO_3^{2-}$; and $Q^+M^+ROPO_3^{2-}$;
    b) at least one water absorption unit $W_{abs2}$ for contacting the moist gas mixture with the liquid absorption medium $A_{VO}$;
    c) at least one water desorption unit $W_{des2}$ which comprises a heat exchanger $W_{x2}$ and is set up for at least partially removing water from a liquid absorption medium $A_{VO}$; and
    d) a circuit $U_2$ which connects the water absorption unit $W_{abs2}$ with the water desorption unit $W_{des2}$ and by means of which the liquid absorption medium $A_{VO}$ may be circulated;
    wherein at least one of the components $W_{abs2}$, $W_{des2}$, and $U_2$ at least partially comprises a surface made of an aluminium material of construction $O_{Al}$; and
    wherein disposed in the apparatus $V_2$ is at least one contact surface at which the liquid absorption medium $A_{VO}$ contacts the surface made of $O_{Al}$;
    and wherein:
        $Q^+$ is a 1,3-dialkylimidazolium where the alkyl groups are independently of one another unbranched or branched $C_1$-$C_6$ alkyl groups;
        R is an unbranched or branched $C_2$-$C_6$ alkyl group;
        and $M^+$ is an alkali metal ion.

9. The process of claim 8, wherein R is selected from the group consisting of: an ethyl group and a n-butyl group.

10. The process of claim 9, wherein:
    a) $Q^+$ is selected from the group consisting of 1,3-dimethylimidazolium, 1,3-diethylimidazolium, 1-ethyl-3-methylimidazolium, 1-n-butyl-3-methylimidazolium; and
    b) the liquid absorption medium $A_{VE}$ is an aqueous solution in which the total weight of all salts of structure $Q^+(RO)_2PO_2^-$, $(Q^+)_2ROPO_3^{2-}$ and $Q^+M^+ROPO_3^{2-}$ is at least 70 wt % based on the total weight of the aqueous solution.

11. An apparatus $V_2$ for dehumidifying a moist gas mixture, comprising the components:
    a) a liquid absorption medium $A_{VO}$ comprising at least one salt selected from the group consisting of: $Q^+(RO)_2PO_2^-$; $(Q^+)_2ROPO_3^{2-}$; and $Q^+M^+ROPO_3^{2-}$;
    b) at least one water absorption unit $W_{abs2}$ for contacting the moist gas mixture with the liquid absorption medium $A_{VO}$;
    c) at least one water desorption unit $W_{des2}$ which comprises a heat exchanger $W_{x2}$ and is set up for at least partially removing water from a liquid absorption medium $A_{VO}$; and
    d) a circuit $U_2$ which connects the water absorption unit $W_{abs2}$ with the water desorption unit $W_{des2}$ and by means of which the liquid absorption medium $A_{VO}$ may be circulated;

wherein at least one of the components $W_{abs2}$, $W_{des2}$, and $U_2$ at least partially comprises a surface made of an aluminium material of construction $O_{Al}$; and wherein disposed in the apparatus $V_2$ is at least one contact surface at which the liquid absorption medium $A_{VO}$ contacts the surface made of $O_{Al}$;

and wherein:

$Q^+$ is a 1,3-dialkylimidazolium where the alkyl groups are independently of one another unbranched or branched $C_1$-$C_6$ alkyl groups;

R is an unbranched or branched $C_2$-$C_6$ alkyl group;

and $M^+$ is an alkali metal ion.

12. The apparatus $V_2$ of claim 11, wherein R is selected from the group consisting of:
an ethyl group and a n-butyl group.

13. The apparatus $V_2$ of claim 11, wherein $Q^+$ is selected from the group consisting of 1,3-dimethylimidazolium, 1,3-diethylimidazolium, 1-ethyl-3-methylimidazolium, 1-n-butyl-3-methylimidazolium.

14. The apparatus $V_2$ of claim 13, wherein the salt is selected from the group consisting of: 1,3-diethylimidazolium diethylphosphate; 1-ethyl-3-methylimidazolium diethylphosphate; and 1-n-butyl-3-methylimidazolium di-n-butylphosphate.

15. The apparatus $V_2$ of claim 11, wherein $A_{VO}$ is an aqueous solution in which the total weight of all salts of structure $Q^+(RO)_2PO_2^-$, $(Q^+)_2ROPO_3^{2-}$ and $Q^+M^+ROPO_3^2$ is at least 70 wt % based on the total weight of the aqueous solution.

16. The apparatus $V_2$ of claim 11, wherein at least one of the components $W_{abs2}$, and $W_{des2}$ is a falling film.

17. The apparatus $V_2$ of claim 11, comprising a further heat exchanger $W_{y2}$ positioned so that liquid absorption medium $A_{VO}$ sent from the water absorption unit $W_{abs2}$ to the water desorption unit $W_{des2}$ is suppliable with heat from liquid absorption medium $A_{VO}$, said medium being conducted away from the water desorption unit $W_{des2}$.

18. The apparatus of claim 12, wherein:
a) $Q^+$ is selected from the group consisting of 1,3-dimethylimidazolium, 1,3-diethylimidazolium, 1-ethyl-3-methylimidazolium, 1-n-butyl-3-methylimidazolium; and
b) the liquid absorption medium $A_{VE}$ is an aqueous solution in which the total weight of all salts of structure $Q^+(RO)_2PO_2^-$, $(Q^+)_2ROPO_3^{2-}$ and $Q^+M^+ROPO_3^2$ is at least 70 wt % based on the total weight of the aqueous solution.

19. The apparatus of claim 18, comprising a further heat exchanger $W_{y2}$ positioned so that liquid absorption medium $A_{VO}$ sent from the water absorption unit $W_{abs2}$ to the water desorption unit $W_{des2}$ is suppliable with heat from liquid absorption medium $A_{VO}$, said medium being conducted away from the water desorption unit $W_{des2}$.

20. An absorption heat pump, comprising the apparatus $V_2$ of claim 11, as further components, a condenser, an evaporator and a coolant, wherein the coolant is water.

* * * * *